United States Patent [19]

Reimann

[11] Patent Number: 4,564,391

[45] Date of Patent: Jan. 14, 1986

[54] METHOD FOR THE RECOVERY OF SILVER FROM SILVER ZEOLITE

[75] Inventor: George A. Reimann, Idaho Falls, Id.

[73] Assignee: The United States of America as represented by the United States Department of Energy, Washington, D.C.

[21] Appl. No.: 708,618

[22] Filed: Mar. 5, 1985

[51] Int. Cl.[4] ............................................. C22B 11/00
[52] U.S. Cl. ............................................. 75/63; 75/83
[58] Field of Search ...................................... 75/63, 83

[56] References Cited

U.S. PATENT DOCUMENTS 2,218,250 10/1940 Reid ........................................ 75/83
3,892,562 7/1975 Miller ..................................... 75/63
4,406,693 9/1983 Heshmatpour et al. .............. 75/251

Primary Examiner—Melvyn J. Andrews
Attorney, Agent, or Firm—James W. Weinberger; Walter L. Rees; Judson R. Hightower

[57] ABSTRACT

High purity silver is recovered from silver exchanged zeolite used to capture radioactive iodine from nuclear reactor and nuclear fuel reprocessing environments. The silver exchanged zeolite is heated with slag formers to melt and fluidize the zeolite and release the silver, the radioactivity removing with the slag. The silver containing metallic impurities is remelted and treated with oxygen and a flux to remove the metal impurities.

About 98% of the silver in the silver exchanged zeolite having a purity of 99% or better is recoverable by the method.

10 Claims, No Drawings

4,564,391

METHOD FOR THE RECOVERY OF SILVER FROM SILVER ZEOLITE

CONTRACTUAL ORIGIN OF THE INVENTION

The U.S. Government has rights in this invention pursuant to Contract No. DE-AC07-76ID01570 between the U.S. Department of Energy and EG&G Idaho, Inc.

BACKGROUND OF THE INVENTION

This invention relates to a method for recovering silver from silver exchanged zeolite. More specifically, this invention relates to a method for the recovery and purification of silver from silver exchanged zeolite which may also contain some radioactivity.

The removal of air-borne radioactive iodines from the atmosphere to prevent surface contamination and possible human ingestion is an important aspect of nuclear safety. These radioactive iodines, which include inorganic species such as elemental iodine, and organic species, such as methyl iodine, may be present in reactor containment vessels from normal reactor operations and, in particular, in the case of fuel element cladding failure and are present in dissolver off-gases from nuclear fuel reprocessing plants. These radioactive iodines are formed in the nuclear fuel by the fissioning of the fuel material.

One method for removing these iodines from the atmosphere is the use of activated charcoal filter beds. However, charcoal will ignite at temperatures above about 300° C. and becomes inefficient when subjected to a high humidity environment.

An effective substitute for charcoal for the removal of both organic and inorganic iodine species from the atmosphere is silver exchanged zeolite. Silver exchanged zeolite is a synthetic zeolite in which the sodium ions have been replaced by silver ions and is prepared by passing an aqueous solution of silver nitrate through a column of synthetic zeolite material which has been suspended in water in the manner described in U.S. Pat. No. 3,658,467 which issued April 25, 1972, is assigned to the common assignee, and is incorporated herein by reference. The silver exchanged zeolite is more effective for removing iodines from the atmosphere than charcoal and will retain radioactive iodines at temperatures above 500° C. Furthermore, the effectiveness of silver exchanged zeolite is not impaired by a high humidity environment and most importantly it is noncombustible.

Silver exchanged zeolite which is loaded with fission product iodine can be reactivated and the radioactive iodine permanently stored by passing a stream of dry hydrogen gas through the bed to remove the iodine as hydrogen iodide which is then sorbed on lead exchanged zeolite which is then converted into a waste form suitable for permanent storage. This is described in U.S. Pat. No. 4,088,737 which issued May 9, 1978 and is assigned to the common assignee.

The cost of silver exchanged zeolite is high because of the silver and the material is subject to poisoning by hydrocarbons which occasionally make their way into reactor and fuel reprocessing plant environments. No successful process has been developed to reactivate poisoned silver zeolite filter beds, so that at present the only solution is to replace the filters with fresh materials.

Due to the necessity of replacing silver exchanged zeolite filters because of poisoning, many thousand pounds of silver exchanged zeolite, some of it slightly radioactive, is presently in storage. Because of the value of the silver in this zeolite, which may vary from 30 to 40 weight percent (w/o), it would be desirable if this silver could be recovered and purified for either reuse or sale. Furthermore, environmental regulations prohibit disposal of the zeolite by burial because of the presence of a heavy metal, i.e. silver, in the zeolite.

Efforts so far to recover the silver from the zeolite have utilized isopropylamine. In this method, the silver zeolite is loaded into a column and contacted with the isopropylamine which washes the silver from the zeolite. However, the isopropylamine is able to remove only silver which is still in the ionic state. About 66% of the silver is recoverable by this method leaving the zeolite still containing about 10 w/o silver. Furthermore, isopropylamine is flammable and unpleasant to use.

SUMMARY OF THE INVENTION

A method has been developed by which essentially all of the silver in the silver exchanged zeolite can be recovered. The method provides a silver which has a very high degree of purity and which is free of any radioactivity which may have been present in the zeolite before recovery began. Furthermore, the method provides a heavy metal-free zeolite containing slag which is suitable for disposal by burial.

The method of the invention consists of first determining the weight of the refractory aluminosilicate in the silver exchanged zeolite, mixing with the silver exchanged zeolite, based on the weight of the aluminosilicate, from about 15 to 25 weight percent (w/o) $Na_2O$, from about 2 to 6 w/o $B_2O_3$ and 6 to 15 w/o $CaF_2$ and/or $NaF$ to form a mixture, heating the mixture to a temperature sufficient to melt the mixture forming a melt containing molten slag and molten silver containing metallic impurities, maintaining the temperature for a period of time sufficient for the molten silver and some of the impurities to separate from the slag, cooling the mixture, and separating the impure silver from the slag, thereby recovering the silver from the silver exchanged zeolite. Any radioactivity in the zeolite will remain in the slag. The silver is purified by remelting the silver containing the metallic impurities, contacting the molten silver with oxygen to oxidize the metallic impurities to metal oxides, adding to the melt a small amount of flux consisting of about $\frac{1}{3}$ by weight fused borax and $\frac{2}{3}$ by weight silica to form metal silicates with the impurities, removing the metal silicates from the surface of the molten silver, and removing any dissolved oxygen from the molten silver, thereby producing a high purity silver.

The method of the invention is capable of the recovery of almost 98% of the silver in the silver exchanged zeolite and providing high purity silver up to 99.99% pure, as determined by atomic absorption spectroscopy analytical methods.

It is therefore one object of the invention to provide an improved method for recovering silver from silver exchanged zeolite. It is another object of the invention to provide an improved method which will recover almost all the silver from silver exchanged zeolite and furthermore, will provide silver having a high degree of purity. Finally, it is the object of the invention to provide an improved method for recovering high purity silver, free from radioactivity, from silver exchanged zeolite which may be radioactive.

DETAILED DESCRIPTION OF THE INVENTION

These and other objects of the invention may be met by determining the weight of the refractory aluminosilicate in the silver exchanged zeolite, mixing with the silver exchanged zeolite, based on the weight of the aluminosilicate, about 20 weight percent (w/o) $Na_2O$ as NaOH, about 5 w/o $B_2O_3$ as fused borax, about 10 w/o $CaF_2$ and/or NaF and about 10 w/o CaO to form a mixture, heating the mixture to about 1250° C. to melt the mixture forming a molten mixture of slag, silver, and metallic impurities, maintaining the temperature for about 10 minutes for the silver and metallic impurities to separate from the slag, cooling the mixture, and separating the silver containing metallic impurities from the slag, thereby recovering the silver from the silver exchanged zeolite. The silver may be further purified by remelting the silver to form a melt, contacting the surface of the melt with oxygen to oxidize the metallic impurities to metal oxides, contacting the melt with sufficient flux to react with the metal oxides to form metal silicates, the flux consisting of about ⅓ by weight fused borax and about ⅔ by weight silica as silica sand, removing the metal silicates which form on the surface from the melt, repeating the steps of contacting the melt with oxygen, contacting the melt with flux and removing the metal silicate until the surface of the melt is free of impurities, and contacting the melt with a rod of carbon to react with any dissolved oxygen in the melt to form $CO_2$, thereby purifing the silver.

The weight of the zeolite, i.e. the refractory aluminasilicate after the water and silver are removed is established in order to determine the quantity of flux to be added to form a fluid slag. For example, certain zeolites contain less alumina which require less fluorides in the flux.

The mixture contains from about 15 to 25, preferably 20, weight percent (w/o) $Na_2O$, based on the weight of the refractory aluminosilicate. The $Na_2O$ may be added as sodium carbonate or preferably as sodium hydroxide since it was found that the sodium carbonate causes a great deal of foaming, which makes melting of the mix difficult. The mix also contains from about 2 to 6, preferably about 5 w/o $B_2O_3$, which is added as fused, or anhydrous borax. The amount of $Na_2O$ in the borax is considered when determining the amount of NaOH or sodium carbonate in the mixture. The mix also contains from about 6 to 15, preferably about 10 w/o, $CaF_2$, NaF or both. The mix may also contains up to 20, preferably 10 w/o CaO, which acts as an additional fluidizer to reduce the viscosity of the slag in order for the molten silver to separate from the slag and coalesce. It is preferred that the mixture of materials be thoroughly blended together to provide uniform melting.

Because the slag resulting from the formulation described above is very corrosive to ceramic materials, the choice of crucible material is critical. Although a clay graphite crucible will contain the melt, silicon carbide such as American Refractories Starrbide ®, crucibles are preferred and have been found satisfactory for a number of melts before replacement is necessary.

Melting of the mixture requires heating to about 1200° to 1300° C., although about 1250° C. is satisfactory. It is important that the melt become sufficiently fluid through temperature and choice of flux that the molten silver droplets coalesce and settle through the molten slag to collect on the bottom of the crucible. It is desirable once the mixture has melted, to maintain the temperature for a short period of time, such as 10–20 minutes, to complete settling of the silver through the slag.

Once melting is completed, the melt can be poured into an appropriate mold to cool while another mixture is processed. Preferably the mold may have a lower pocket for the molten silver to solidify in the form of an ingot and to facilitate separation of this ingot from the slag after cooling.

One advantage of the method of the invention is that generally, any radioactivity remaining in the silver exchanged zeolite such as the radioactive elements cesium[137] or strontium[90] will remain with the slag, so that the silver recovered by the method is free from any radioactivity.

The silver, after separation from the slag, will generally contain some entrained slag in addition to small amounts of metallic impurities such as iron, nickel, chromium, copper and lead. These impurities can be removed and a high purity silver prepared by first remelting the silver and mechanically removing any particles of slag and iron from the surface of the melt. The melt is then contacted with oxygen to oxidize the metal impurities to metal oxides. This may be done by inserting an oxygen lance into the melt or preferably contacting the surface of the melt with oxygen under about 2–3 psi from a lance for about 5 minutes until the metal impurities are oxidized and float to the top of the melt. The melt is then contacted with sufficient flux consisting of about ⅓ by weight borax and ⅔ silica as silica sand to react with the metal oxides. The flux forms metal silicates with the metal oxides on the surface of the melt which can be easily removed from the melt manually using a cool steel rod. In general, an amount of flux sufficient to cover the surface of the melt is sufficient. Once the metal silicates have been removed, the melt is again contacted with oxygen to oxidize any additional metal impurities which may not have been oxidized the first time. The melt is then contacted with the flux as before and the metal silicates removed. Generally, about two purification cycles are adequate to completely remove the metallic impurities from the molten silver. Analysis by atomic absorption spectroscopy of silver purified in this manner have shown the silver to have a purity from 99.97 to 99.99%.

The molten silver will contain dissolved oxygen which must be removed before the silver is allowed to solidify. The oxygen can be removed by contacting the melt with carbon which reacts with the dissolved oxygen to form $CO_2$. Preferably, the oxygen is removed by inserting a carbon rod into the melt until evolution of $CO_2$ ceases indicating removal of all oxygen.

The following Examples are provided to illustrate the method of the invention and are not to be taken as limiting the scope of the invention wich is defined by the appended claims.

EXAMPLE I

A sample from a batch consisting of 567.8 Kg of silver exchanged zeolite which had been contacted with isopropylamine to remove the silver was analyzed to determine the refractory aluminosilicate content. The analysis determined that the stripped zeolite contained 19.9% water and about 10% by weight silver. To 104.5 Kg of this stripped silver exchanged zeolite was added 20.8 Kg NaOH, 9.09 Kg anhydrous borax, 11.12 Kg NaF and 13.75 CaO to prepare a mixture weighing 159.3 Kg. 25.5 Kg of this mixture was placed into a silicon carbide crucible and heated in a propane-fired furnace to drive off the water. Heating continued until the melt reached 1250° C. when another 8 Kg of the mixture was added. When the temperature again reached 1250° C., additional mix was added until the mixture in the melt totaled 51 Kg. When the melt again reached 1250° C., as measured by a thermocouple, the furnace was turned off. After about 20 minutes, the temperature had cooled to about 1219° C. The melt was then poured into a mold having a lower pocket to facilitate separating the silver ingot from the slag. After cooling, the weight of the silver was determined to be 3.831 Kg while the slag weighed 45.3 Kg. After the entrained slag and iron had been removed from the silver, the silver ingot constituted 11.7% of the weight of the stripped silver zeolite that was calculated to be in the curcible charge.

EXAMPLE II

A batch of silver exchanged zeolite which had not been stripped of silver was analyzed and found to contain 7.1% by weight water and 33 weight percent silver. 53.3 Kg of this zeolite was mixed with 10.4 Kg CaO, 10.4 Kg $CaF_2$, 23.8 Kg NaOH and 7.6 Kg fused anhydrous borax to form a mixture totaling 153.69 Kg. From this mixture, a total of 51.2 Kg was added in several steps to a crucible as described in the previous Example. After the last batch was added and the melt had reached a temperature of 1232° C. as measured by optical pyrometer, the furnace was turned off. About 20 minutes later when the temperature was 1193° C., the melt was poured into a mold. After cooling, the silver was sepatated from the slag and weighed. 12.374 Kg of silver was recovered. The silver ingot constituted 34.64% of the weight of the silver zeolite that was calculated to be in the crucible charge.

EXAMPLE III

The silver ingot of Example II, designated as heat #10 was placed in a crucible and melted. A lance held about 1 inch from the surface of the melt discharged oxygen at about 3 psi for about 5 minutes to saturate the melt with oxygen and to oxidize the metallic impurities to metal oxides. A small amount (enough to cover the top of the melt) of a flux of $\frac{1}{3}$ by weight fused borax and $\frac{2}{3}$ silica sand was added to the top of the melt to form metal silicates with the oxidized metal impurities which floated to the surface of the melt. This slag was removed with a cool steel rod. The melt was contacted again with oxygen as before for about 5 minutes to oxidize additional metal impurites.

Additional flux was added to the surface as before and the metal silicates removed. Oxygen was once more directed on the surface of the melt, but no metal oxides were evident so flux was not added. Since the silver was saturated with oxygen, a graphite rod was inserted into the melt until evolution of $CO_2$ had ceased, indicating that removal of the oxygen was complete. The silver was then poured into several ingots. Analysis of the silver by atomic absorption spectroscopy showed the ingots to be 99.99% silver.

As can be seen from the above description and Examples, the method of the invention provides an effective and efficient process for the recovery and purification of silver from silver exchanged zeolite.

The embodiments of this invention in which an exclusive property or privilege is claimed are defined as follows:

1. A method for recovering silver from silver exchanged zeolite comprising:
   determining the weight of refractory aluminosilicate in the silver exchanged zeolite,
   mixing with the silver exchanged zeolite, based on the weight of the aluminosilicate, from about 15 to 25 weight percent $Na_2O$, from about 2 to 6 weight percent $B_2O_3$, and 6 to 15 weight percent of one or more selected from the group of $CaF_2$ and NaF to form a mixture,
   heating the mixture to a temperature sufficient to melt the mixture, forming a melt of molten slag, molten silver, and metallic impurities,
   maintaining the temperature for a period of time sufficient for the molten silver to separate from the slag,
   cooling the mixture, and
   separating the silver containing the impurities from the slag thereby recovering the silver from the silver exchanged zeolite.

2. The method of claim 1 wherein the mixture also contains up to about 20 weight percent CaO.

3. The method of claim 2 wherein the $Na_2O$ is added as sodium carbonate or sodium hydroxide.

4. The method of claim 3 wherein the $B_2O_3$ is added as fused borax.

5. The method of claim 4 wherein the mixture is heated to about 1200° to 1300° C.

6. The method of claim 1 including the additional steps of:
   remelting the silver separated from the slag,
   contacting the molten silver with oxygen to oxidize any metallic impurities to metal oxides,
   adding to the melt, a flux of fused borax and silica sand in an amount sufficient to form metal silicates with the metal oxides,
   removing the metal silicates from the molten silver, and
   removing any dissolved oxygen from the molten silver thereby forming high purity silver.

7. The method of claim 6 wherein the flux is about $\frac{1}{3}$ by weight borax and $\frac{2}{3}$ by weight silica sand.

8. The method of claim 7 wherein the mixture contains about 20 weight percent $Na_2O$, about 5 weight percent $B_2O_3$, about 10 weight percent of a fluoride selected from the group of $CaF_2$ and NaF and about 10 weight percent CaO.

9. The method of claim 8 wherein the mixture is heated to about 1250° C.

10. A method for recovering and purifying silver from radioactive silver exchanged zeolite containing radioactive elements comprising:
    determining the amount of refractory aluminosilicate in the silver exchanged zeolite,
    mixing, with the silver zeolite, based on the weight of the aluminosilicate, from about 15 to 25 weight percent $Na_2O$ in the form of sodium carbonate or sodium hydroxide, from about 2 to 6 weight percent $B_2O_3$ in the form of fused borax, from about 6 to 15 weight percent of one or more fluorides selected from the group of $CaF_2$ and NaF and up to 20 weight percent $CaO_2$ to form a mixture,
    heating the mixture to about 1200° to 1300° C. to form a melt of molten slag, molten silver and metallic impurities, maintaining the temperature for about 10 minutes for the silver and metallic impurities to separate from the slag, cooling the mixture, separating the silver containing metallic impurities from the slag, the radioactive elements remaining in the slag, reheating the silver to form a melt, contacting the molten silver with oxygen to oxidize the metallic impurities to metal oxides, contacting the molten silver with sufficient flux to react with the metal oxides to form metal silicates on the surface of the melt, the flux consisting of about ⅓ by weight fused borax and ⅔ by weight silica sand, removing the metal silicates from the surface of the melt, and contacting the melt with carbon to remove any oxygen in the melt as $CO_2$ thereby recovering and purifying the silver.

* * * * *